United States Patent [19]

Flauraud

[11] Patent Number: 4,984,947
[45] Date of Patent: Jan. 15, 1991

[54] FASTENER

[75] Inventor: Daniel J. N. Flauraud, Taverny, France

[73] Assignee: Avdel Systems Limited, Welwyn Garden City, England

[21] Appl. No.: 472,249

[22] Filed: Jan. 30, 1990

[30] Foreign Application Priority Data

Feb. 1, 1989 [FR] France .................. 89 01269

[51] Int. Cl.⁵ .................. F16B 13/04; F16B 21/00
[52] U.S. Cl. .................. 411/43; 411/339; 411/361
[58] Field of Search .................. 411/43, 338, 339, 352, 411/353, 361

[56] References Cited

U.S. PATENT DOCUMENTS

| 3,371,572 | 3/1968 | King, Jr. .................. | 411/361 |
| 3,443,472 | 5/1969 | Darr, Jr. et al. .................. | 411/361 |
| 4,138,921 | 2/1979 | McGauran et al. .................. | 411/510 |
| 4,609,317 | 9/1986 | Dixon et al. .................. | 411/43 X |
| 4,717,300 | 1/1988 | Alvi et al. .................. | 411/361 |
| 4,846,611 | 7/1989 | Sadri et al. .................. | 411/43 |
| 4,850,771 | 7/1989 | Hurd .................. | 411/43 |
| 4,897,004 | 1/1990 | Norton .................. | 411/43 |
| 4,900,205 | 2/1990 | Sadri .................. | 411/43 X |

FOREIGN PATENT DOCUMENTS 2262160 6/1973 Fed. Rep. of Germany ...... 411/361
2606498 9/1976 Fed. Rep. of Germany ...... 411/45

Primary Examiner—Gary L. Smith
Assistant Examiner—Suzanne L. Dino
Attorney, Agent, or Firm—Oblon, Spivak, McClelland, Maier & Neustadt

[57] ABSTRACT

A fastener, intended for fastening a sandwich panel (b) to a support (a), and including a headed bolt (1) having a break off tail portion, and a flanged tubular body (4) into which the main portion of the shank (3) of the bolt is pulled so as to lockingly interengage the body and set the fastener, includes a deformable tubular spacer (10) disposed on the shank (3) of the bolt (1) between the body (4) and the head (2) of the bolt (1). The spacer (10) is in the form of a sleeve having a tubular central core, and peripheral grooves (12) between which are annular fins (11). The spacer is capable of being deformed to a substantially shorter axial length by axial compression under substantially constant predetermined load. When the fastener is installed and set in work of less than the maximum thickness intended for the fastener, the spacer (10) is deformed by axial compression between the body (4) and the bolt (1), and relieves the work member of the need to bear substantially all of the load required to lockingly interengage the bolt (1) and the body (4), and break the tail portion from the main portion of the bolt (1).

7 Claims, 3 Drawing Sheets

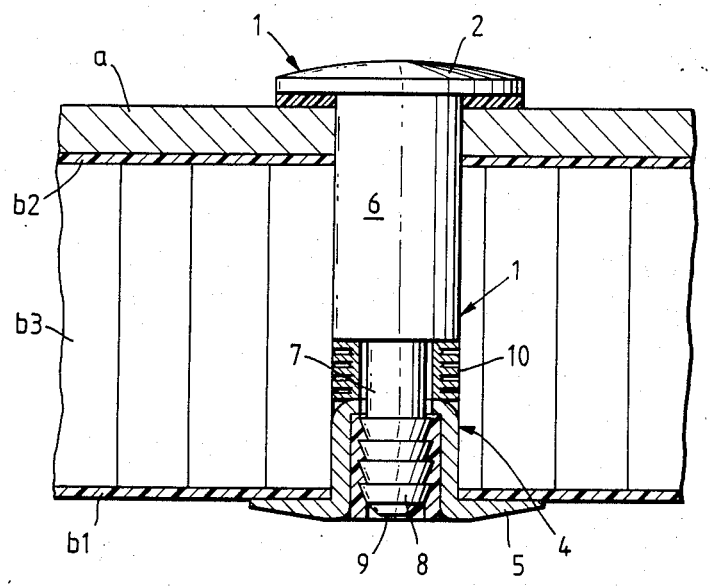
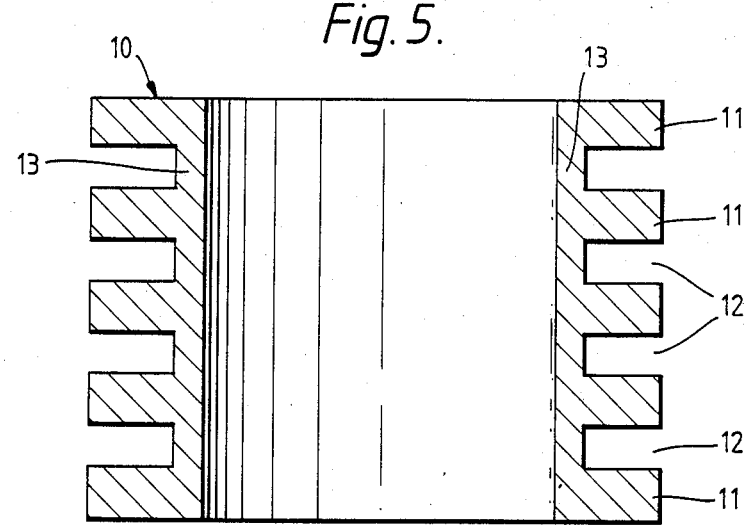

FASTENER

FIELD OF THE INVENTION

This invention relates to a fastener of the kind generally identified as "pull-to-set fasteners" and comprising a headed bolt which can be inserted into registering apertures in work members, such as a panel and a support, to be fastened, and a flanged tubular body into which the bolt can be inserted and pulled axially, without rotation, the bolt and the body having mutually interengageable engaging means whereby the bolt and the body can be locked together so as to secure the members to be fastened between the head of the bolt and the flange of the body. Such a fastener is hereinafter referred to as a "fastener of the kind defined".

DISCUSSION OF THE BACKGROUND

In a known fastener of this kind, described in our British Pat. No. 1538423, the engaging means of the bolt comprises a plurality of annular barbs in a suitable position on the shank of the bolt and the engaging means of the body comprises a resiliently deformable part into which the barbs of the bolt are able to embed so as to resist withdrawal of the bolt from the body once they are interengaged.

The bolt has a tail portion which can pass freely through the body, whereby the bolt can be gripped and pulled relative to the body by a suitable tool so as to clamp together the members to be fastened and cause interengagement of the engaging means, and which portion breaks off from the rest of the bolt at a predetermined tensile load, leaving the rest of the bolt together with the interengaged body to fasten the members together.

The known fastener has been used extensively in the construction of freight containers, in which it has been found satisfactory for securing, to a metallic supporting framework, panels of such materials as plywood which may have a face-covering skin of plastics material, particularly glass fiber reinforced plastics material, which is engaged by the flange of the body of the fastener. Such panel materials are sufficiently resistant to withstand the pressure with which the flange is forced to bear against the face of the panel.

However, this is not so in the case of panels known as "sandwich panels" or "honeycomb board", consisting of a cellular matrix secured by adhesion between two sheets of reinforced plastics material, which are less resistant to localized compressive loads and which also tend to show variations in thickness due to tolerances in manufacture. Such panels can suffer damage in or around the zone on which the flange bears, due to the compression load applied during setting of the fastener before reaching the predetermined load at which the bolt will break.

SUMMARY OF THE INVENTION

The present invention aims to provide an improved fastener of the kind defined, with a view to avoiding this disadvantage of the known fastener.

It has been found that by providing the fastener with a deformable spacer which is disposed on the shank of the bolt between the bolt head and the body of the fastener and which is capable of being deformed b compression when the body of the fastener is forced to move towards the head of the bolt and into mutually locking interengagement with the bolt, a substantial amount of the force which is normally applied to the bolt and body during setting of the fastener is absorbed by deformation of the spacer, thereby reducing the amount of force which is applied to the members to be fastened, and, provided the maximum force which can be applied is limited to a predetermined amount, by, for example, the breaking of the bolt at a breakneck, the amount of force applied to the members to be fastened can be limited so as to avoid damage to the work members.

Thus, it is possible to prevent the flanged body from applying an excessive force to the face of a panel of honeycomb board and thus to avoid damaging the board.

According to the invention there is provided a fastener comprising a bolt having a shank and a :ead at one end, and a flanged tubular body into which the shank of the bolt can be inserted, the bolt and the body having mutually interengageable engaging means whereby, on forcing the body along the shank and towards the head of the bolt so as to cause the engaging means to interengage, the body and bolt can be locked together so as to fasten together apertured work members disposed on the bolt between the head of the bolt and the flange of the body, the fastener including means for limiting to a predetermined maximum the amount of force which can be applied to set the fastener, the fastener including a deformable tubular spacer which is disposed on the bolt between the head and the body, and which is capable of abutting the body and being deformed by compression when the body is forced into locking engagement with the bolt, the spacer being adapted to absorb a substantial amount of the force applied in moving the body along the bolt and setting the fastener, and thereby reduce the amount of force applied to the work members.

BRIEF DESCRIPTION OF THE DRAWINGS

The invention will now be described by way of example, with reference to the accompanying diagrammatic drawings in which:

FIGS. 3 and 4 show the fastener in two later stages of installation and,

FIG. 5 shows, on an enlarged scale, an axial cross-section of a deformable spacer forming part of the fastener shown in FIG. 1.

DESCRIPTION OF THE PREFERRED EMBODIMENTS

Figure 1:
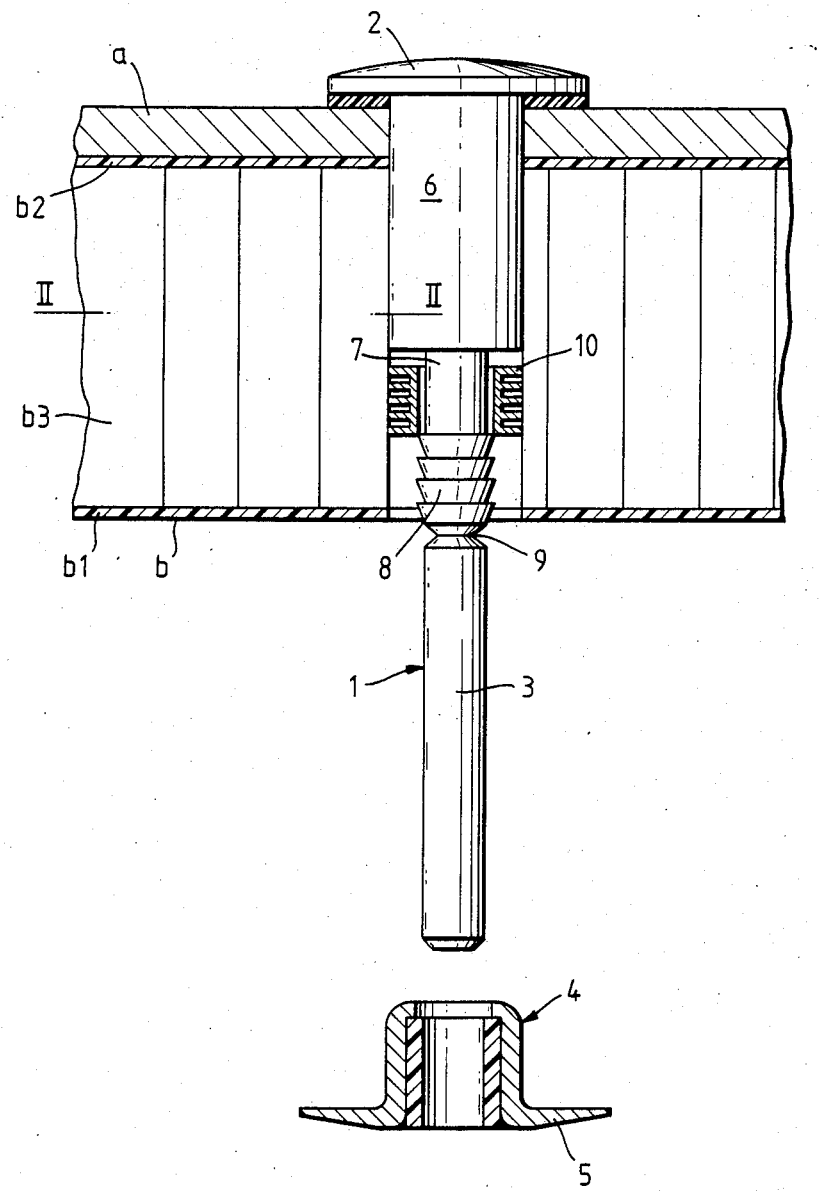
FIG. 1 is an elevational view, mainly in section, showing a fastener according to the invention together with a sandwich panel and a support member which are to be fastened together, and illustrates a first stage in the installation of the fastener.
Figure 2:
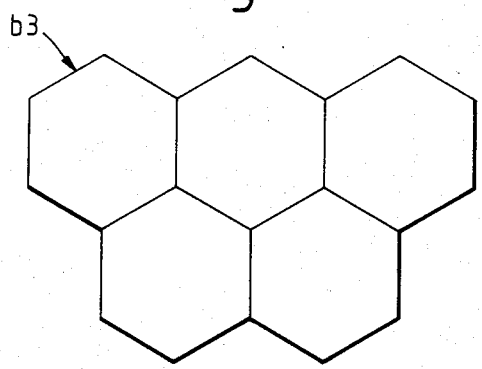
FIG. 2 is a view of the panel in section parallel to its surface taken on the line II—II of FIG. 1.

The fastener comprises two essential parts, namely a bolt 1 having an enlarged head 2 and an elongate shank 3, and, for the other part, a tubular body 4, which is radially enlarged at one end to provide a flange 5.

The shank 3 of the bolt has a main portion adjacent to the head 2, and a tail portion extending to the end remote from the head 2. The main portion of the shank 3 comprises a cylindrical neck 6, which adjoins the head 2, followed by a cylindrical stem 7, the diameter of which is smaller than the neck so as to form a shoulder between the stem 7 and the neck 6. The stem 7 is followcd by a zone 8 having engaging means in the form of a plurality of annular barbs. Each of the annular barbs extends radially to a more or less sharp annular crest having a diameter greater than that of the stem 7 and is directed towards the head 2 of the bolt.

At the end of the zone 8, remote the from the head 2, is a breakneck 9 of such a reduced diameter as to forx' the weakest part of the bolt and such that when the bolt is subjected to a predetermined tensile load it will break at the breakneck rather than elsewhere. Beyond the breakneck is the tail portion which may be formed with striations or grooves to facilitate gripping of the tail portion and pulling of the bolt by a suitable tool.

The length of the main portion of the bolt, which comprises the neck 6, the stem 7 and the barbed zone 8, is made appropriate to the thickness of the work member in which it is intended to use the fastener. The construction of the fastener is such as to accommodate some variation over a small range in the thickness of the work, but the length of the main portion is generally made such that in work members of the intended thickness, with the bolt head 3 abutting one face of the work members and the shank extending through registering apertures in the work members, the tail portion of the shank projects beyond an opposite face of the work and the main portion of the shank is entirely within thc work, preferably with the breakneck aligned with the said opposite face.

Figure 3:
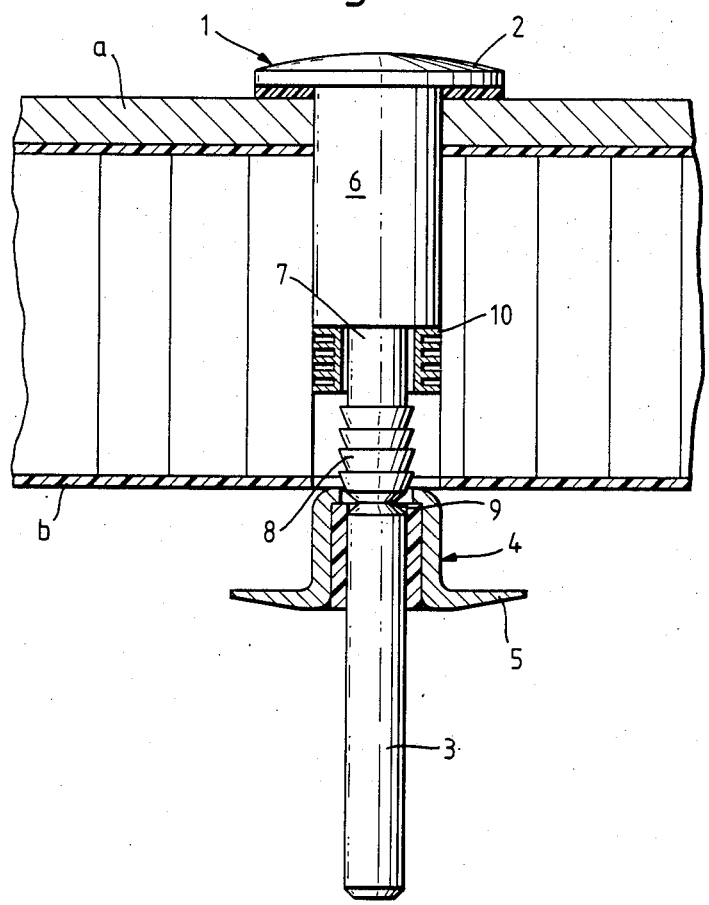

The tubular body 4 has an internal lining of resiliently deformable material, such as a polyamide resin, of such internal diameter that the body can be passed along the tail portion of the bolt towards the bolt head 2 and then forced over the barbs of the zone 8 which then embed in the lining material and resist withdrawal of the body in the direction away from the bolt head, as shown in FIG. 3.

In order to instal the fastener, a gripping and pulling tool is used, which, while gripping the tail portion of the bolt shank 3, abuts against the flange 5 of the body and pulls the bolt, thereby forcing the body along the shank towards the head of the bolt until it becomes mutually and lockingly engaged with one or more of the barbs in the zone 8.

Referring to FIG. 1, the members of the workpiece be fastened by means of the fastener are a metal support member (a), such as a frame of a vehicle body, and a panel (b) of the kind known as a "sandwich panel" or "honeycomb board" having two facing sheets b1 and b2 of plastics material and a cellular matrix or core b3 between the sheets, the core being secured to the sheets by bonding, or adhesively, and spacing them apart in parallel relationship.

The core b3 has a low compressive strength and in order to prevent damage to the panel (b) when fastening it to the support member (a), a deformable tubular spacer 10 is disposed on the shank of the bolt so as to occupy a position between the neck 6 and the barbed zone 8.

The length of the spacer 10 is made such that when the fastener is completely installed in a work member of the maximum intended thickness, the body engages and may slightly compress the spacer 10 against the shoulder presented by the neck, with the work members being subjected to a slight degree of compression between the head 3 of the bolt and the flange 5 of the body.

However, when the fastener is installed in a work member having a thickness less than the intended maximum, the body 4 engages and begins to compress the spacer against the shoulder before the flange 5 engages the near face of the adjacent panel. As the tool continues to force the body along the shank of the bolt until the flange 5 meets the near face of the panel, the spacer is progressively deformed, becoming shorter in its axial length.

The force required to deform the spacer increases the amount of force required to move the body nearer to the head of the bolt to an amount approaching that required to cause the bolt to break at the breakneck. When the flange 5 then eventually engages the panel, a small amount of additional force is required to compress the panel and the total force applied therefore increases rapidly to an amount which the breakneck is unable to sustain, with the result that the breakneck 10 breaks and thus prevents the application of any further compressive force to the workmember. Installation of the fastener is then complete.

The spacer 10 is designed and dimensioned so as to undergo a substantial reduction in length by deformation under a load which increases only slightly, the load being in a predetermined range of values which, together with the load required to force the body along the shank, is slightly below that required to break the breakneck. Thus, the panel is then only required to bear the slight amount of extra load which is required to break the breakneck.

Referring to FIG. 5, the 10 of this embodiment is made of a ductile alloy of aluminum conforming to British Standard 1474, although other materials such as annealed low alloy steel have been used with satisfactory results.

The spacer is generally in the form of a tubular cylinder or sleeve, having an axial bore of such a diameter as to enable the spacer to be moved along the shank 3 of the bolt, passing the barbed zone 8 with slight clearance, until it abuts the shoulder provided by the neck 6.

The peripheral surface of the spacer is formed with a plurality of annular fins 11 which are spaced from each other by deep annular grooves 12. Peripherally of the bore, and radially inwardly of the fins and grooves, is a central tubular core 13 which is continuous from end to end of the spacer.

In use of the fastener, the core 13 acts as a load-bearing column which bears the compression load applied between the body 4 and the neck 6, and is capable of being compressed, in the axial direction, to a length shorter than its original length.

When the core is sufficiently shortened by compression, all the fins 11 may eventually abut each other, and, having done so, increase very greatly the rcsistance of the spacer to further shortening. The fins thus serve as stops to limit the extent to which the spacer can be shortened, so that, in practice, the spacer can only be compressed to a certain minimum length which corresponds to the total thickness, in the axial direction, of all the fins. This minimum length is a function of the number and thickness of the several fins.

In the absence of the fins, the compression of the core could result in the core being deformed so as become increasingly barrel-shaped, in which case it would, up to a point become progressively less effective to absorb the compression force applied.

However, the peripheral fins also act as hoops, which by their presence, restrain the tendency of the core to become barrel shaped, and thus help to preserve the core as a load-supporting column. It is therefore desirable, although not essential, that there be several of the fins spaced apart along the length of the core, so as to restrain any tendency for the core to become barrel-shaped in local regions along its length.

The fins should also be of sufficient thickness to be able withstand, without splitting, the radially outward forces to which they will be subjected when the core tends to become barrel-shaped. If the fins split radially they become ineffective as hoops.

The resistance of the core to axial compression is primarily a function of its wall thickness, i.e. the thickness between the root of each peripheral grc,ove 12 and the central bore of the spacer. For a given diameter of the central bore, this wall thickness will therefore depend on the depth of each of the grooves 12.

By adjusting the depth of the grooves 12, and the number, and relative widths, of the grooves a.nd the fins, it is possible to finely adjust the degree of resistance of the spacer 10 to axial compression under load, and the minimum length to which it can be compressed.

We have found that four grooves of equal depth, giving five fins, and in which the widths of the fins and groves are the same, gives good results. However the number of grooves, and also the relative widths and depths of the fins and grooves can be varied, so as to provide grooves wider than the fins, or fins wider than the grooves. For a given diameter of the central bore, the depth of some or all of the grooves 12 can be varied so as to enable variation, with close control, of the resistance to compression of the core of the spacer according to the amount of compressive force which the spacer is required to absorb, in order to relieve the panes of the need to bear that amount of the load.

The invention is not limited to the details of the forgoing example.

What is claimed as new and desired to be secured by Letters Patent of the United States is:

1. A fastener which comprises:
   a bolt having a shank and a head at one end,
   a flanged tubular body into which the shank of the bolt can be inserted, the bolt and the body having mutually interengageable engaging means whereby, on forcing the body along the shank and towards the head of the bolt so as to cause the engaging means to interengage, the body and bolt are lockable together so as to fasten together apertured work members disposed on the bolt between the head of the bolt and the flange of the body, and
   an axially deformable tubular spacer means for limiting to a predetermined maximum the amount of axial force which can be applied to set the fastener, which spacer means is disposed on the bolt between the head and the body, and when the body is forced into locking engagement with the bolt, abuts the body and is deformed in an axial direction by axial compression, the spacer means being adapted to absorb a substantial amount of the force applied in moving the body along the bolt and setting the fastener, and thereby reduce the amount of force applied to the work members.

2. A fastener according to claim 1, wherein the spacer comprises a tubular sleeve of such axial length as to be able to abut the body and a shoulder presented by the bolt when the body enters into locking interengagement with the bolt on installation and setting of the fastener in the work members of the intended maximum thickness.

3. A fastener according to claim 1 wherein the spacer has a central tubular core, and peripheral grooves defining a plurality of annular fins between the grooves, which fins are able to restrain the tendency of the core to become barrel-shaped when deformed by axial compression.

4. A fastener according to claim 3, wherein the fins are evenly spaced along the length of the spacer.

5. A fastener as claimed in either of claim 3 or 4, wherein the spacer has five of the fins.

6. A fastener as claimed in claim 1, wherein the stem of the bolt comprises a main portion adjacent to the head and including the engaging means of the bolt, and a tall portion connected to the main portion by a breakneck of predetermined breaking strength, and wherein the spacer is dimensioned and adapted to increase the amount of force required to force the body into locking interengagement with the bolt to an amount approaching sufficiently close to that required to break the breakneck to be sustainable by sandwich panels such as those used in construction of freight containers.

7. A fastener as claimed in claim 1, wherein the spacer is formed of a ductile metal, such as annealed low alloy steel.

* * * * *